United States Patent [19]
Hosokawa

[11] Patent Number: 4,675,224
[45] Date of Patent: Jun. 23, 1987

[54] MAGNETIC RECORDING MEDIUM

[75] Inventor: Minoru Hosokawa, Suwa, Japan

[73] Assignee: Seiko Epson Kabushiki Kaisha, Tokyo, Japan

[21] Appl. No.: 453,658

[22] Filed: Dec. 27, 1982

[30] Foreign Application Priority Data
Dec. 26, 1981 [JP] Japan ............................. 56-210822
Jan. 29, 1982 [JP] Japan ............................. 57-12722

[51] Int. Cl.$^4$ .............................................. G11B 5/62
[52] U.S. Cl. ..................................... 428/65; 428/213; 428/409; 428/457; 428/473.5; 428/694; 428/702; 428/900
[58] Field of Search .................. 428/694, 900, 473.5, 428/700, 693, 64, 65, 213, 409, 457, 702

[56] References Cited
U.S. PATENT DOCUMENTS
4,210,946 7/1980 Iwasaki et al. ..................... 360/131

Primary Examiner—George F. Lesmes
Assistant Examiner—William M. Atkinson
Attorney, Agent, or Firm—Blum Kaplan

[57] ABSTRACT

The magnetic recording medium includes a soft magnetic thin film layer of high magnetic permeability formed on a substrate, a non-magnetic thin film layer formed on the soft magnetic layer and a magnetic thin film for recording information thereon formed on the non-magnetic thin film layer. The film thickness of the non-magnetic thin film layer is equal to or less than that of the magnetic thin film layer for recording. And the non-magnetic thin film layer is an amorphous or macromolecular substance upon which the crystalline structure of the recording thin film layer forms with a perpendicular orientation favorable for magnetization.

10 Claims, 11 Drawing Figures

MAGNETIC RECORDING MEDIUM

BACKGROUND OF THE INVENTION

This invention relates generally to a magnetic recording medium and more particularly to a magnetic recording medium allowing high density recording by enlargement of the magnetic moment in the direction perpendicular to the surface of the magnetic recording medium. When the recorded magnetic moment is increased in the direction of the medium thickness, that is, in the direction perpendicular to the medium surface, recording density on a magnetic recording medium can be increased. When recording density is increased still more, magnetization on the medium is primarily with moments in the perpendicular direction. Accordingly, it is advisable to apply a magnetic field in the direction which is perpendicular with respect to the medium surface in advance of recording. Further, with regard to the recorded magnetization on the medium, it is also advisable to provide a medium whereon the magnetic moments are oriented in advance in the direction perpendicular to the surface. Generally, perpendicular magnetic recording is a technique to record and reproduce in the direction of thickness of the medium, that is, in the direction perpendicular to the medium surface. That is described in detail in The Journal of Magnetics Society of Japan, "Possibilities of Perpendicular Magnetic Recording", May 26, 1977.

In prior art perpendicular magnetic recording, the medium is recorded in the perpendicular direction. However, in these recording systems, recorded magnetization is generally decreased through a diamagnetic field produced by the medium itself. Also, the magnetic field at the edge portion of the magnetic head has a relatively large component which is parallel to the medium surface. Accordingly, when information is recorded magnetically by moving the medium relatively against the magnetic pole, the medium is magnetized by the magnetic field at the trailing edge portion of the pole relative to the moving direction of the head. Consequently, parallel components of the recording magnetic field primarily form the magnetic moments stored in the medium. This phenomenon is unfavorable for perpendicular magnetic recording and reproduction. Further, quality of recording and reproduction is adversely affected when the recording medium itself does not have its crystals magnetically oriented perpendicular to the medium surface.

What is needed is a magnetic recording medium having a recording surface with favorably oriented crystal structure and a construction which lends itself to perpendicular magnetization without substantial parallel magnetic components.

SUMMARY OF THE INVENTION

Generally speaking, in accordance with the invention, a magnetic recording medium especially suitable for high density recording is provided. The magnetic recording medium includes a soft magnetic thin film layer of high magnetic permeability formed on a substrate, a non-magnetic thin film layer formed on the soft magnetic layer and a magnetic thin film for recording information thereon formed on the non-magnetic thin film layer. The film thickness of the non-magnetic thin film layer is equal to or less than that of the magnetic thin film layer for recording. And the non-magnetic thin film layer is made from an amorphous substance upon which the crystalline structure of the recording thin film layer forms with a perpendicular orientation favorable for magnetization.

Accordingly, it is an object of this invention to provide an improved magnetic recording medium permitting high recording density.

Another object of this invention is to provide an improved magnetic recording medium having superior crystal orientation in the magnetic recording film to improve the quality of perpendicular recording.

A further object of this invention is to provide an improved magnetic recording medium which is less costly to produce than prior art mediums and provides high recording density.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
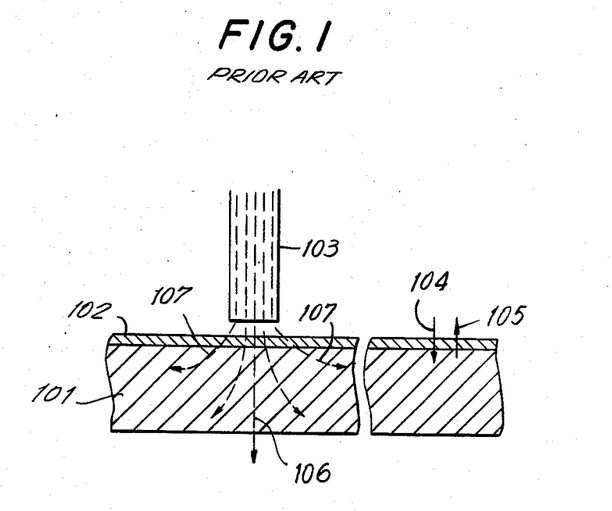
FIG. 1 is a functional representation of the prior art relationships between a magnetic recording medium and a magnetic head for reading and writing on said medium.

FIG. 1 is a side sectional view illustrating the principles of magnetic recording in the perpendicular direction with respect to the surface of a magnetic recording medium. In FIG. 1, the surface of a substrate 101 is covered by a thin magnetic film layer 102 which is the magnetic recording medium which is subsequently magnetized so as to write data thereon. A magnetic pole 103 of a magnetic head (not shown) faces the medium 102 and concentrates the recording magnetic field generated by coils (not shown) into the area of the medium 102 which faces the end of the magnetic pole 103. Thereby, the medium 102 is magnetized in accordance with recording information provided to the coils in the known manner.

At this time, the recording magnetic field which is applied to the medium 102 is oriented in the direction which is perpendicular with respect to the surface of the medium 102, namely, in the direction of the medium thickness as shown in FIG. 1 by a broken line arrow 106. The medium 102 is magnetized in the perpendicular direction by such a magnetic field for perpendicular recording. However, in this recording system, recorded magnetization is generally diminished as a result of a diamagnetic field 105 produced by the medium 102 itself when a thin film magnetic medium is magnetized in a direction which is perpendicular with respect to the surface. The magnetizing field is indicated by the arrow 104. However, when the wave length of recorded magnetization corresponds approximately to the thickness of the medium 102 it is possible to neglect such de-magnetization effects produced by a diamagnetic field 105.

Further, a magnetic field at the edge portion of the magnetic pole 103 has a direction as shown by arrows 107 in FIG. 1. In particular, a parallel component of recording magnetic field at the pole edges is ralatively larger than the perpendicular component of the recording magnetic field at the center of the magnetic pole 103. Accordingly, when information is recorded magnetically as by relatively moving the medium 102 against the magnetic pole 103, the medium is magnetized by the magnetic field at the trailing edge portion of the pole 103 relative to the moving direction of the head. Consequently, the parallel component of the recording magnetic field is the main producer of magnetic moments in the medium 102 for the reasons discussed above. This phenomenon is unfavorable for perpendicular magnetic recording and reproduction.

Figure 2:
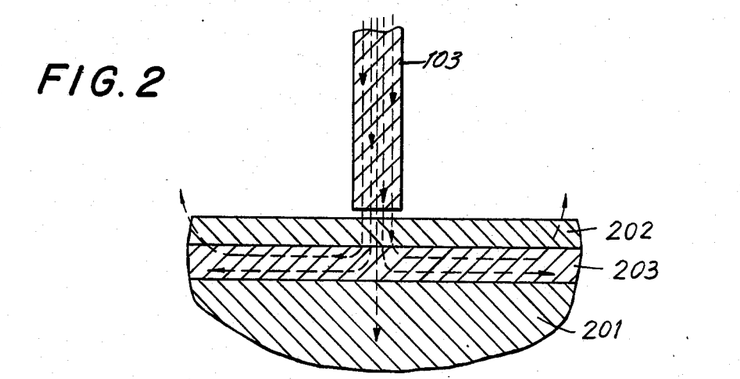
FIGS. 2 and 3 illustrates magnetic fields and the residual magnetization state when a magnetic recording medium including a soft magnetic layer is used.

FIG. 2 illustrates another system for perpendicular magnetic recording. In FIG. 2, a thin, soft magnetic film layer 203 with high magnetic permeability is provided between the magnetic recording medium 202 and a substrate 201 in order to avoid the above described phenomenon related to parallel components of the recording magnetic field. Thereby, the recorded magnetic field produced by the magnetic pole 103 in the medium 202 is in the direction perpendicular with respect to the medium surface even at the edge portions of the magnetic pole 103. Further, in such a structure, there is no demagnetization effect by generated diamagnetic fields produced by the layer 202 even in a range where wave length of the recorded magnetization is comparatively large as compared to the medium thickness. In FIG. 2, a recording magnetic field is, as shown by the broken lines perpendicular with respect to the medium 202 at the portion of the medium 202 which opposes the magnetic pole 103.

Figure 3:
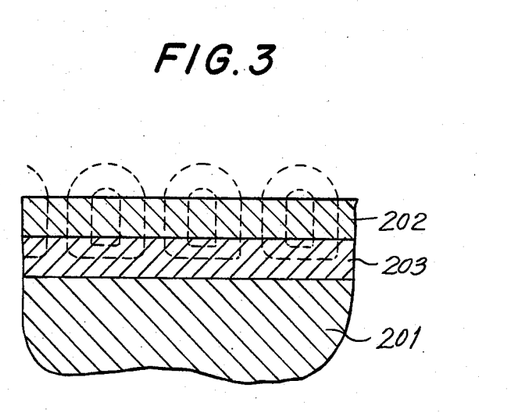

FIG. 3 illustrates the directions of the magnetic field flux lines which are applied to the medium 202 by the recording method illustrated in FIG. 2. In FIG. 3, the recorded magnetization in the medium 202 produced by moving the medium 202 relative to the magnetic pole 103 is shown, as well as the magnetic field produced by the recorded magnetization. Arrows within the medium 202 show the direction of the recorded magnetization of the medium 202, and the broken lines show the magnetic field, that is, the flow of magnetic flux produced by these magnetizations. The magnetic fields close into loops formed between magnetization arrows which are adjacent to each other and which have opposite directions from each other. In particular, all magnetization within the medium 202 is oriented in the direction which is perpendicular with respect to the medium surface as a result of the existence of a high magnetic permeability in the thin film layer 203. Within the thin film layer 203, the magnetic field orients in a direction which is parallel with respect to the magnetic layer 202.

In order to better and more easily orient the magnetization in the magnetic medium 202 in the direction perpendicular with respect to the medium surface, it is desirable that the magnetic domain of the medium itself is arranged in the direction perpendicular with respect to the medium surface. In other words, it is desirable that the easy axis of magnetization of the crystal material in the medium layer 202 be oriented perpendicularly with respect to the medium surface. As a practical matter, it is possible to orient an alloy including rate earth elements or elements such as Co—Cr, and the like, in the perpendicular direction with respect to the surface by means of sputtering or evaporation techniques.

Figure 4:
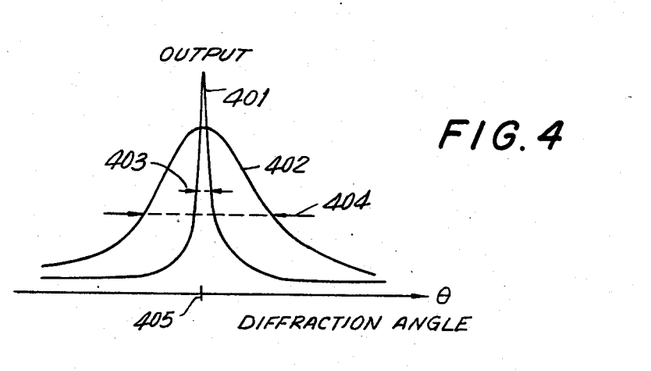
FIG. 4 illustrates characteristic crystal orientation data produce by X-ray diffraction of a medium for perpendicular magnetic recording.

FIG. 4 is a diagram showing the state of crystal orientation of manufactured Co—Cr alloy magnetic film as measured by X-ray diffraction. In FIG. 4, the abscissa shows the diffraction angle $\theta$ and the ordinate indicates diffraction output. At an angle 405, the easy axis of magnetization in the magnetic layer is in the direction which is perpendicular with respect to the medium surface. In interpreting FIG. 4, the narrower is the distribution adjacent to the angle 405, and the larger is the amplitude at the peak, the more is the domain of easy magnetization oriented in the perpendicular direction with respect to the medium surface. To the contrary, when the output distribution adjacent to the angle 405 is broad, and the amplitude at the peak is low, it is deemed that the orientation of the domain has a scattering.

In FIG. 4, the curve 401 represents data measured in a condition where a Co—Cr magnetic film is formed on a glass substrate. The curve 402 represents data measured where a Fe—Ni alloy is formed on a substrate as a high magnetic permeability film and further a film of Co—Cr alloy is formed on top of the Fe—Ni alloy by sputtering. It is clear from FIG. 4, that the orientation state of the Co—Cr magnetic film formed on the Fe—Ni alloy film is inferior to that formed on the glass substrate. Namely, when a magnetic recording medium of multi-layer construction as shown in FIG. 2 or FIG. 3 is formed, the magnetic anisotropy of the magnetic medium 202 itself is of a mono-layer construction which is inferior as compared with that of the magnetic medium 102 illustrated in FIG. 1. The effect of a high magnetic permeability film 203 provided beneath the recording medium 202 is substantially reduced as a result of the scattering described above which results when the recording film 202 is formed on top of the high permeability film 203.

The magnetic recording medium in accordance with the invention resolves the problems described above associated with conventional techniques and provides a magnetic recording medium suitable for high density magnetic recording while at the same time reducing process cost. As described hereinafter, an object of this invention is to provide an improved magnetic recording medium comprising three thin film layers on a substrate, in particular the layers are a soft magnetic thin film layer, a non-magnetic thin film layer and a magnetic thin film layer for recording. This arrangement is used in order to attain superior crystal orientation in the top magnetic thin film layer where data is stored, that is, an orientation of crystal structure which is perpendicular to the recording medium surface.

The formation of a Co—Cr alloy film on glass was discussed above with regard to FIG. 4. When such a Co—Cr alloy film is formed not on a glass substrate, but on another substrate by sputtering, a film having a highly favorable orientation can also be obtained. For example, when a Co—Cr film is formed, after an $SiO_2$ or another film which is generally similar to an amorphous state is formed, a sharp which is generally similar to an amorphous state is formed, a sharp X-ray diffraction peak similar to that shown in curve 401 of FIG. 4 is also obtained. As stated the characteristics of a Co—Cr film formed on a glass substrate are illustrated in FIG. 4.

In FIG. 4, a range 403 of the angle $\theta$, where output is 50% or greater than the peak output is measured. When forming a Co—Cr alloy film on an amorphous film base layer, as described above, the range 403 includes only a few degrees. When a Co—Cr alloy film is formed on a so-called polyimide substrate, or on another substrate made from macromolecular materials, the range 403 of angle $\theta$ has a similar number of degrees. On the other hand, the curve 402 represents measured data for a Co—Cr alloy film formed on the Ni—Fe permalloy film. In the curve 402, the output peak is extremely low as compared to the characteristic curve 401, and the range 404 of the angles within which output is 50% or more of the output at the peak, is greatly expanded to approximately 10° to 20°.

Further, when a permalloy film other than those in the Ni—Fe series is used as a substrate, for example, a permalloy film including Cu—Mo, the same poor results, similar to the curve 402, are obtained. Further, when aluminum, or other metal or alloy including these metals are used as a substrate for the recording layer, the same poor results as indicated in curve 402, or even worse, result.

As a result of measuring the magnetic anisotropy of magnetic films, it has been confirmed that the achievement of a curve which is high and acute in the peak range as illustrated in curve 401 of FIG. 4, depends upon the magnetic characteristics of the magnetic recording film in the direction perpendicular to the surface of the magnetic recording film.

As a result, it is desirable to use materials for medium sputtering of the substrate having quite different sized diffraction grating from that of the magnetic recording medium itself. When using a metal as a substrate, since the lattice constant of the metal is close to that of the magnetic recording film, the magnetic film grows easily being influenced by the substrate metal.

On the other hand, when an amorphous material or a macromolecular material is used as a substrate, the magnetic recording film grows without being influenced by the substrate. Therefore, a film having a superior anisotropy can be obtained. In practice, in the range wherein a film thickness is more than several thousand angstroms, a Co—Cr film formed on an amorphous or macromolecular material results in a superior X-ray diffraction characteristic, similar to the characteristic curve 401 in FIG. 4, without any exceptions.

Figure 5:
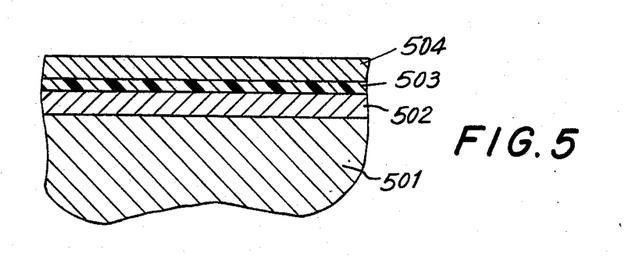
FIG. 5 is a partial sectional view to an enlarged scale of a magnetic recording medium in accordance with the invention.

FIG. 5 illustrates in section the construction of a magnetic recording medium in accordance with the invention. A high magnetic permeability soft magnetic film 502 is formed on a substrate 501. Further, a non-magnetic film 503 is formed on the soft magnetic film 502. The non-magnetic film 503 is made from the above described amorphous, or other materials similar to the amorphous, or macromolecular materials.

A magnetic recording medium having high quality can be obtained through sputtering Ni—Fe alloy as the material for the soft magnetic film 502. $SiO_2$ is sputtered to be the non-magnetic film 503, and a Co'Cr alloy is produced as the magnetic film 504 continuously by using the same sputtering device. Moreover, it is also possible to form the non-magnetic film 503 by chemical vapor deposition techniques or merely as a spin coat. Concerning the good results in orienting the easy axis as described above, this does not depend on the soft magnetic materials or magnetic film materials for recording independently, but rather on a combination of the kinds of materials.

Here, the Ni—Fe alloy as the soft magnetic film 502, $SiO_2$ as the non-magnetic film 503 and Co—Cr alloy as the magnetic film 504, are continuously deposited in a single sputtering device as described hereinafter. It is possible to deposit the non-magnetic layer 503 by chemical vapor deposition techniques or by spin coating. The superior characteristics of the magnetic recording medium resulting from the above described construction (FIG. 5) is attained by combining soft magnetic materials with other magnetic materials for recording information thereon.

In the magnetic recording medium in accordance with the invention, the advantage of superior perpendicularly oriented crystals of the magnetic thin film for recording are achieved by forming the film on the amorphous or macromolecular material while at the same time the perpendicularity of the recording and recorded fields is maintained in the magnetic film for recording by having the high permeability substrate also present in the construction.

The processes for producing a magnetic disc are now described. In a conventional method, a magnetic disc using a magnetic recording medium with high density as illustrated in FIG. 3, has an aluminum alloy shaped into a disc to serve as a substrate. This is similar to the construction of coated discs. Then, a surface of the aluminum alloy disc is polished by means of an abrasive and on the aluminum alloy substrate, two thin layers 202, 203 are formed by evaporation or sputtering in a vacuum.

Figure 8:
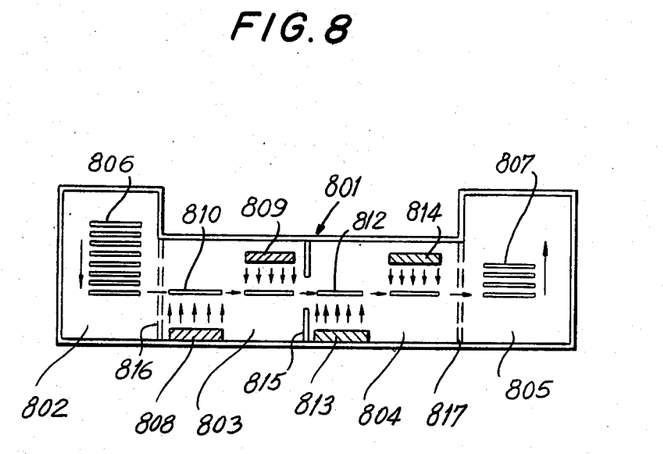
FIG. 8 is a schematic representation of a vacuum device for production of discs having magnetic films formed continuously by sputtering.

With reference to FIG. 8, a vacuum device 801 is illustrated for forming these two magnetic films 202, 203 continuously by sputtering. The vacuum device 801 includes a first vacuum chamber 802 wherein magazines 806, to which many polished aluminum discs are mounted, are sealed. Then the chamber 802 is evacuated to a reduced pressure. One by one discs 810 are taken from the magazines 806 and transported to a Fe—Ni sputtering chamber 803. In this sputtering chamber 803, a target 808 of Fe—Ni is first sputtered toward the lower surface of the disc 810 and thereby a thin film of Fe—Ni is formed. Then, in the same manner, a thin Fe—Ni film is formed on the upper surface of the disc 810 by sputtering of a target 809. Thus, a thin magnetic film of Fe—Ni with high magnetic permeability is formed on both sides of the disc. Then the disc is transported to a Co—Cr sputtering chamber 804, and is identified therein in FIG. 8 with the reference numeral 812. In this Co—Cr sputtering chamber, a Co—Cr magnetic film is formed on both surfaces by sputtering of targets 813, 814 in turn in the same manner as described above. Thus a Co—Cr magnetic film is formed in the chamber 803.

Then, the disc, sputtered twice on both surfaces, is transported to a final chamber 805 where the discs are stored in a disc mount magazine 807 ready for removal. In this device 801, the first vacuum chamber 802 and the last chamber 805 are isolated from the sputtering chambers 803, 804 by vacuum-tight walls 816, 817. Also, the sputtering chambers 803 and 804 are isolated from each other by a wall 815 and thereby no cross-effects from each sputtering are produced in the other chamber. Namely, it is necessary to avoid interference and interaction between both sputtering processes so that two different sputtering conditions are not superimposed and different ingredients are not intermixed. The device 801 illustrated in FIG. 8 is inevitably large in size and requires many process steps with a resultant small throughput capacity. If using a different technique for forming the films by evaporation, the construction of an apparatus to accomplish this technique is similar to the sputtering device 801 described above. Additionally, as it is desirable to form an anisotropic film as previously described, it is unavoidable that a practical evaporating device must be larger than a sputtering device.

Figure 6A:
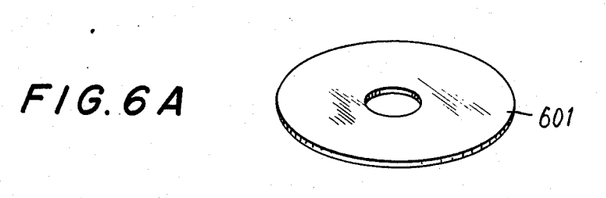
FIG. 6A is a perspective view of a magnetic disc and FIG. 6B is a partial sectional view to an enlarged scale of a recording medium including the disc of FIG. 6A.

FIG. 6A shows a disc produced by the following processes. After shaping a soft magnetic alloy having a high magnetic permeability into a disc 601 and removing the machine distortions and magnetic distortion by annealing, the surface of the disc is polished with abrasives. Removing of distortions by annealing or improvement of magnetic characteristics are also available after the polishing by an abrasive. Magnetic films 602, for example, Co—Cr, and the like, are formed on both surfaces of the disc/substrate 601 by sputtering, subsequent to forming a thin non-magnetic layer 603 on both surfaces of disc 601 and thus, a magnetic disc is provided.

Figure 6B:
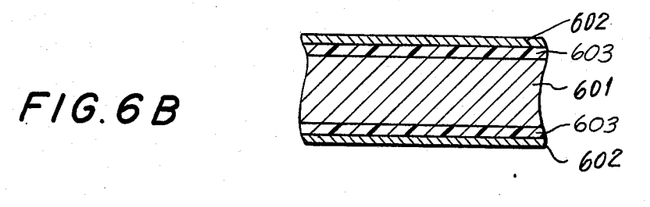

Accordingly, the substrate 601 in FIGS. 6A, B, plays the role of structural means for providing mechanical strength for the disc itself and at the same time, serves as a high magnetic permeability film equivalent to the film 203 shown in FIG. 3. In using the above method with a high magnetic permeability substrate/disc, it is clear that the steps of sputtering are reduced by half in comparison with the conventional manufacturing processes for a disc as shown in FIG. 8. Thereby, a substantial improvement in production output from the device is obtained. Also, there is no problem of interference as can occur in the device of FIG. 8 in that sputtering processes with different kinds of materials are occurring in chambers adjacent one to the other. Therefore, construction and processing conditions of the device (FIG. 6B) are simplified and a high yield is obtained.

Figure 7A:
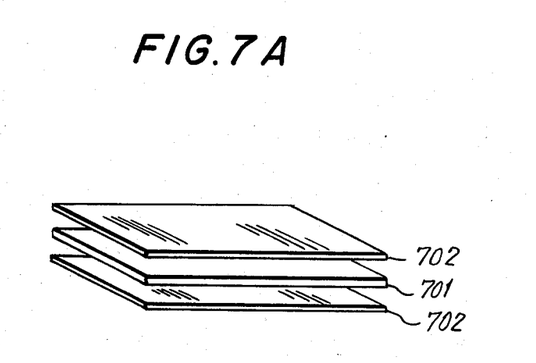
FIGS. 7A, B, C illustrate steps in construction of a laminated magnetic recording disc.
Figure 7B:
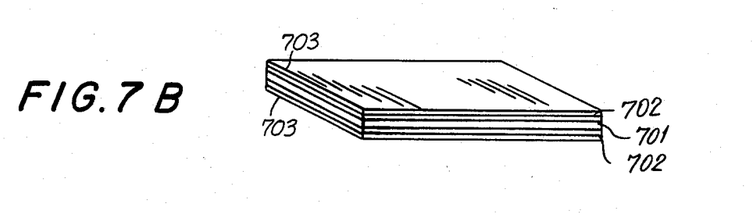
Figure 7C:
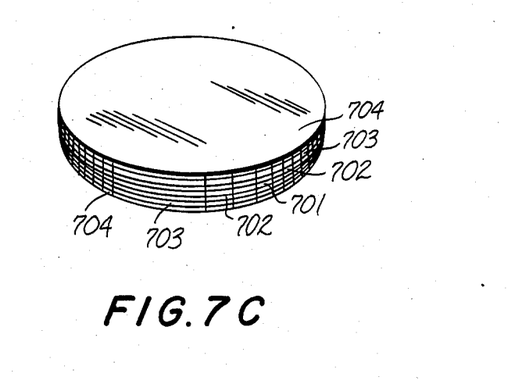

As illustrated in FIG. 7A, high permeability magnetic plates 702 are positioned on both sides of an aluminum alloy plate 701 as a laminated construction. These three plates 701, 702 are joined together by pressure welding and a layered substrate is formed as shown in FIG. 7B. Then, the substrate FIG. 7B is cut, abraded and relieved of distortions to produce a disc substrate as shown in FIG. 7C. The above three substrates 701, 702 can be joined by welding and also by means of an adhesive. In the method illustrated in FIG. 7, a difference of thermal expansion rates resulting from the difference in the materials can be ignored when the high magnetic permeability plates 702 are substantially thinner than the aluminum alloy plate 701. The composite disc (FIG. 7C) effectively has the same plate and mechanical strength as that of the aluminum alloy. Then, a magnetic disc is completed by first forming a thin non-magnetic layer 703 on the exposed planar surface of each plate 702 and then forming a magnetic film 704 for recording over both layers 703 in the same process as described with reference to FIG. 6. The magnetic disc produced by the method of FIG. 7 has the same advantages as the disc produced by the methods of FIG. 6. Namely, the manufacturing steps in sputtering are reduced by a large amount and a practical disc can be provided.

With reference to a construction as shown in FIG. 5, when the portion 501 is formed by using a high magnetic permeability substrate as shown in FIG. 6, there is no need to have the high magnetic permeability film 502. The non-magnetic layer 503 is formed easily by dipping, sputtering or a chemical vapor deposition technique. Then, the recording magnetic film 504 is added by sputtering and the advantage of easy magnetization may be obtained for perpendicular recording.

In a magnetic recording medium in accordance with the invention, it is advantageous that the conventional double sputtering process for forming Fe—Ni and Co—Cr films on a substrate can be avoided by utilizing a high magnetic permeability material in the substrate/disc itself and by adopting a single sputtering process for forming only the Co—Cr film. Thus, there is no interference in the sputtering processes due to double sputtering of different materials in the same sputtering chamber. Manufacturing equipment for sputtering is compact in size and process yield is improved. Further, amorphous or other non-magnetic films are easily deposited on the above described substrates for improving crystal anisotropy of the Co—Cr film.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might to said to fall therebetween.

What is claimed is:

1. A magnetic recording medium comprising:
   a substrate formed entirely of a high magnetic permeability material said substrate having a first surface;
   a thin non-magnetic film on said first surface of said substrate of high magnetic permeability material said thin non-magnetic film having a second surface on a side thereof opposite said first surface; and
   a magnetic thin film for magnetically recording information on said thin non-magnetic film;
   said magnetic thin film being formed on said non-magnetic thin film layer with a crystal orientation in a direction perpendicular to said second surface, said perpendicular direction providing an easy axis for magnetization of said magnetic thin film layer for recording,
   said non-magnetic film layer having a thickness not greater than that of said magnetic film for recording.

2. A magnetic recording medium as claimed in claim 1, wherein said substrate is a disc.

3. A magnetic recording medium as claimed in claim 1, wherein said magnetic thin film for recording is an alloy film.

4. A magnetic recording medium as claimed in claim 3, wherein said magnetic thin film for recording is a Co—Cr alloy.

5. A magnetic recording medium as claimed in claim 1, wherein said first surface is planar.

6. A magnetic recording medium as claimed in claim 1, wherein said first substrate has an additional surface parallel to said first surface.

7. A magnetic recording medium as claimed in claim 1, wherein said thin non-magnetic film is one of an amorphous substance or a macromolecular resin.

8. A magnetic recording medium as claimed in claim 1, wherein said thin non-magnetic film is one of a polyimide resin or amorphous $SiO_2$.

9. A magnetic recording medium as claimed in claim 1, wherein said magnetic thin film layer for recording formed on said thin non-magnetic film is the product of one of a sputtering process and an evaporation process, or is an alloy film.

10. A magnetic recording medium as claimed in claim 9, wherein the thin film for recording comprises a Co—Cr series alloy.

* * * * *